April 25, 1961     A. ABOLINS     2,981,555
FOLDING KING PIN

Filed March 23, 1960     2 Sheets-Sheet 1

INVENTOR.
ANDREW ABOLINS
BY
*Max R. Millman*
ATTORNEY.

INVENTOR.
ANDREW ABOLINS
BY Max R. Millman
ATTORNEY

2,981,555
FOLDING KING PIN

Andrew Abolins, Penndel, Pa., assignor to Strick Trailers, a division of Fruehauf Trailers Co., Philadelphia, Pa., a corporation of Michigan Filed Mar. 23, 1960, Ser. No. 17,195

10 Claims. (Cl. 280—433)

This invention relates to a king pin unit adapted to be carried by a trailer and to be engaged by a coupling unit carried by a fifth wheel or reversely to be carried by the fifth wheel and to be engaged by a coupling unit carried by the trailer.

The primary object of the invention is to provide a pivotally mounted king pin which is movable from a substantially horizontal storage position to a substantially vertical ready-to-couple position, the same including an easily operable slide means serving the dual function of selectively retaining the king pin in both its horizontal and its vertical positions.

Another object of the invention is to provide a folding king pin and a slide means to retain the same selectively in a horizontal storage position behind a plate and in a vertical ready-to-couple position through a slot in the plate, the slide means cooperating with the king pin to effectively close off the slot in both positions and thereby minimize the deposition of dirt and debris behind the plate in the region of the king pin.

Another object of the invention is to provide a folding king pin of the character described which includes means to restrain the vertical movement or rattling of the slide means when it retains the king pin in its horizontal storage and its vertical ready-to-couple positions.

Yet another object of the invention is to provide a folding king pin and a manually operable slide member which is movable from within a housing that stores the same to an operative position in which the slide member retains the king pin in its horizontal or vertical position.

These and other objects will become more apparent as the following description proceeds in conjunction with the accompanying drawings, wherein.

Specific reference is now made to the drawings wherein similar reference characters are used for corresponding elements throughout.

Figure 1:
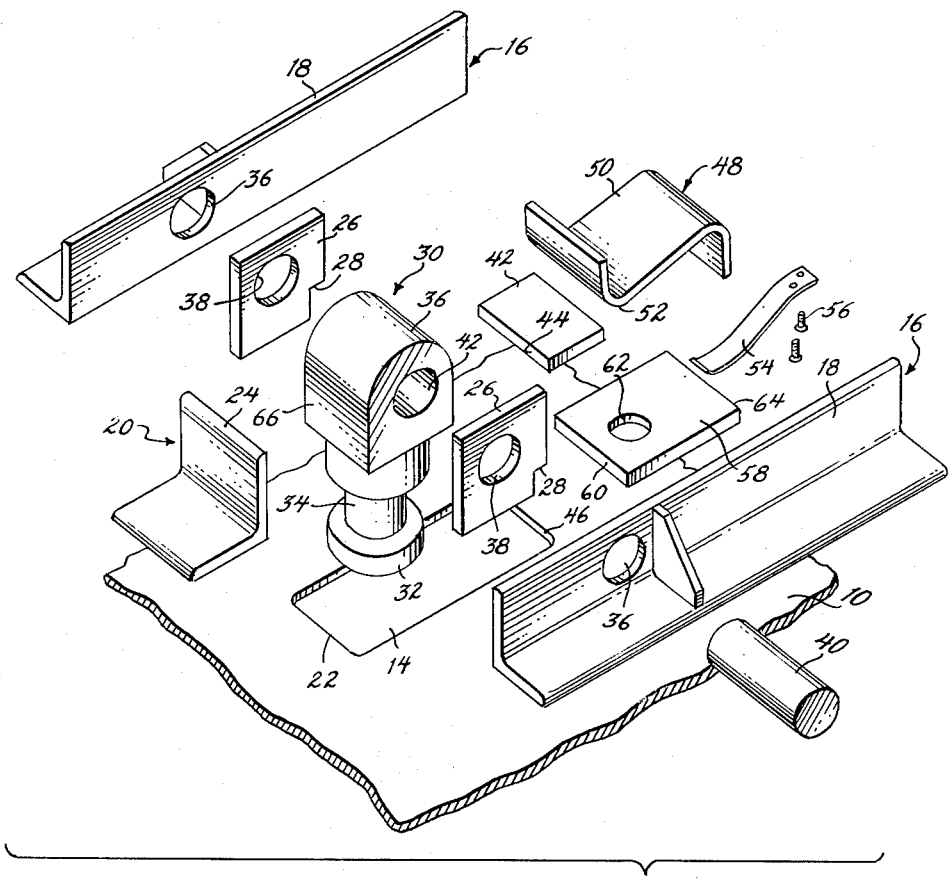
Figure 1 is a group perspective view of the device.
Figure 5:
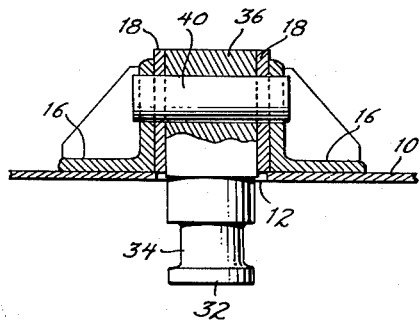
Figure 5 is a sectional view taken on the line 5—5 of Figure 2.

Indicated at 10 is a metallic plate which is adapted to be secured at a predetermined position beneath a trailer, fifth wheel or other vehicle, and spaced from the bottom 12 thereof the plate including an elongated slot 14 therein. It is to be understood at this point that while the plate may be separately secured to the vehicle, it is within the purview of this invention that it can be an integral part of the entire king pin unit.

Secured as by welding or any equivalent means to the plate on both sides of the longitudinal edges of the slot 12 are a pair of members 16, preferably angle bars, having vertical walls 18. Between the side members 16 is an angle stop 20 which is secured to the walls 18 and the plate 10 adjacent a transverse edge 22 of the slot 14, the angle stop including a vertical wall 24 which is preferably as high as the walls 18 of the side members. Also secured to or integral with the walls 18 are vertically extending plates 26 having notches 28 at one of their lower corners opening towards the slotted plate 10.

A king pin 30 is provided which includes a free end 32, a reduced preferably cylindrical portion 34 next to it and adapted to be engaged by a coupling unit (not shown), and an enlarged portion 36 next to the reduced portion 34. Horizontally aligned apertures 36 and 38 are provided in the vertical walls 18 and plates 26 respectively. A horizontally extending pivot pin 40 extends through the apertures 36 and 38 and through a bore 42, through the enlarged portion 36 of the king pin, the diameter of the bore exceeding that of the pivot pin 40, the latter being fixed by any suitable means to the walls 18 of the side members 16. Hence the king pin is pivotally mounted on pivot pin 40 between the side members 16. The portion 36 of the king pin is so dimensioned that its width approximates the distance between the plates 26, its length approximates the distance between the vertical wall 24 of the angle stop 20 and the notches 28 of the plates 26, and its height approximates that of the vertical walls 18.

Figure 2:
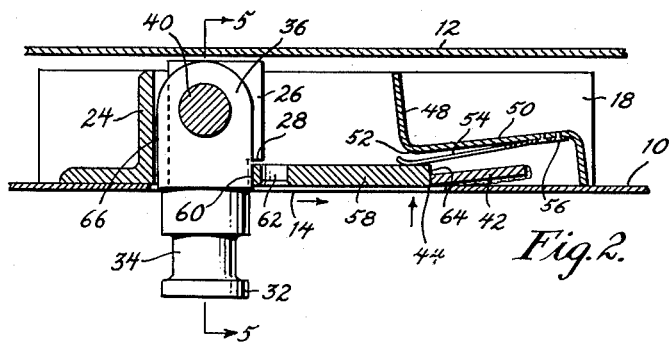
Figure 2 is a vertical longitudinal sectional view taken on a line midway between the side angle members and illustrating the vertical or ready-to-couple position of the king pin.
Figure 3:
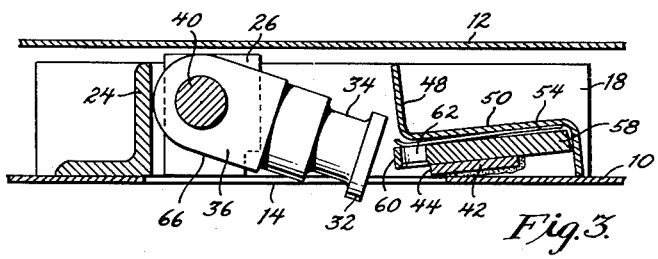
Figure 3 is a view similar to Figure 2 and illustrating the movement of the king pin towards a horizontal storage position.
Figure 4:
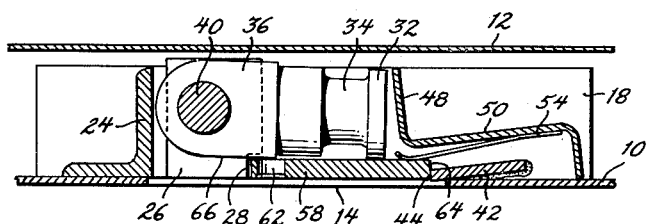
Figure 4 is a view similar to Figure 2 showing the final horizontal storage position of the king pin.

As will be seen from Figures 2–4, the king pin is movable from a vertical ready-to-couple position in which the free end portions 32 and 34 extend through the slot 14 through an intermediate position to a substantially horizontal storage or inoperative position. A manually operable slide means is provided to releasably retain the king pin in said horizontal and vertical positions. This means comprises a stop bar 42 extending between and terminally secured to the vertical walls 18 of the side members 16, the bar including an edge 44 confronting the king pin and terminating adjacent the other transverse edge 46 of the slot 14, the bar preferably inclining downwardly towards the slot.

A generally Z-shaped housing 48 extends between and is terminally secured to the vertical walls 18, the housing enclosing the stop bar 42 and including a wall 50 inclined similarly to but spaced from the stop bar 42. As is evident from Figures 2–4, the housing opens towards the king pin and includes a corner portion 52 somewhat beyond the edge 44 of the stop bar in the direction of the king pin. A leaf spring 54 is anchored at its rear end by appropriate screws 56 to the inner surface of the housing wall 50 and extends somewhat beyond the corner 52.

A slide bar 58 is provided which is wider than the slot 14, has a thickness less than the distance between the housing wall 50 and the top bar 42, has an edge 60 confronting the king pin, a finger hole 62 near said edge and an edge 64 remote from the king pin, the length of said slide bar approximating the distance between the enlarged portion 36 of the king pin and the edge 44 of the stop bar 42 when the king pin is in its vertical ready-to-couple position as shown in Figure 2.

In operation after installation of the king pin unit and slotted plate 10 in the vehicle, the slide bar 58 is retained by the aid of the spring 54 in the space between the stop bar 42 and the wall 50 of the housing as shown in Figure 3. To effect a ready-to-couple position, the king pin is manually rotated to a vertical position wherein the free end portions 32 and 34 extend through the slot 14 of the plate. Then the operator inserts a finger into the hole 62 and pulls the slide against action of the spring 54 towards the king pin until the edge 60 of the slide is received in the notches 28 of the plates 26, at which point the edge 60 of the slide is closely adjacent the body portion 36 of the king pin. At this point also, the remote edge 64 of the slide butts against the confronting edge 44 of the stop bar 42. Hence, movement of the king pin in a direction towards the housing 48 is restrained. Similarly the movement of the king pin in an opposite direction is also restrained because the face 66 of the king pin remote from the housing butts against the vertical wall 24 of the angle stop 20. In this position, the slide 58 and the king pin effectively close off the slot 14 and prevent dirt and debris from entering behind the plate 10 in the region of the king pin. Moreover, because the height of the notches 28 only exceed the thickness of the slide by a small amount, the corner 52 of the housing is also a relatively short distance above the remote edge 64 of the slide and the spring 54 normally bears down on the slide urging it against the plate 10, vertical movement or rattling of the slide is limited.

To go from the vertical ready-to-couple position of Figure 2 to the horizontal storage position of Figure 4, the operator applies upward finger pressure on the remote end of the slide 58, as indicated by the arrow in Figure 2, until the operator senses that the slide strikes the corner 52 of the housing which thereby serves as an indexing means. Then with a finger inserted in the hole 62 the slide is pushed back into the housing as shown in Figure 3. The king pin is then raised through the slot 14 until it clears the plate 10 at which point the operator again pulls the slide 58 out of the housing and pushes it towards the angle stop 20 until the edge 60 of the slide again enters the notches 28 and the remote edge 64 thereof butts against the edge 44 of the stop bar 42. In this position the free end portions 32 and 34 of the king pin rest upon the slide bar which again cooperates with the portion 36 of the king pin to effectively close off the slot 14 in the plate 10.

It will be understood that skilled artisans may make minor variations in the construction, shape and arrangement of parts without departing from the spirit of the invention and the scope of the appended claims.

I claim:

1. A folding king pin construction comprising a support including a pair of spaced side members, a king pin, means pivotally securing said king pin between said side members for movement from a horizontal storage position to a vertical ready-to-couple position, and means including a bar carried by said support and operative to releasably retain said king pin selectively in said horizontal and said vertical positions, said bar being movable to a position wherein an edge thereof is closely adjacent the body of said king pin when the latter is in its vertical position and said bar being movable to a position beneath the body of said king pin when the latter is in its horizontal position.

2. A folding king pin construction comprising a pair of spaced side members, a king pin, means pivotally securing said king pin between said side members for movement from a horizontal storage position to a vertical ready-to-couple position, and slide means carried by said members and operative to releasably retain said king pin selectively in said horizontal and said vertical positions, said last-named means including a stop bar secured between said side members and having an edge confronting said king pin and a bar slidable to an operative position wherein one of its edges butts against said confronting edge of said stop bar in which operative position said slide bar selectively extends beneath the free end portion of said king pin when the latter is in its horizontal storage position and has its edge opposite said one of its edges closely adjacent the body of said king pin when the latter is in its vertical ready-to-couple position.

3. In combination with a plate having a longitudinal slot therein, a folding king pin construction comprising a pair of longitudinal members secured to said plate on both sides of said slot, a king pin, means pivotally mounting said king pin adjacent one of its ends on said members for movement between them from a horizontal storage position above said plate to a vertical ready-to-couple position in which the free end portion of said king pin extends through said plate, and means including a member slidable on said plate operative to releasably retain said king pin selectively in said horizontal and said vertical positions, said member extending across said slot and beneath the body of said king pin when the latter is in its horizontal position, said member also extending across said slot and including an edge closely adjacent the body of said king pin when the latter is in its vertical position.

4. In combination with a plate having a longitudinal slot therein, a folding king pin construction comprising a pair of longitudinal members secured to said plate on both sides of said slot, a king pin, means pivotally mounting said king pin adjacent one of its ends on said members for movement between them from a horizontal storage position above said plate to a vertical ready-to-couple position in which the free end portion of said king pin extends through said plate, and means including a member slidable on said plate operative to releasably retain said king pin selectively in said horizontal and said vertical positions, said last-named means including a stop bar secured between said longitudinal members and having an edge confronting said king pin, and a bar slidable to an operative position wherein one of its edges butts against said confronting edge of said stop bar and said slide bar bridges said slot, in which operative position said slide bar extends beneath the free end portion of said king pin when the latter is in its horizontal storage position and has its edge opposite said one of its edges closely adjacent the body of said king pin when the latter is in its vertical ready-to-couple position.

5. The combination of claim 4 and means limiting vertical movement of said slide bar relative to said plate.

6. The combination of claim 5 wherein said vertical movement limiting means includes a member adjacent said king pin having a notch receiving said opposite edge of said slide bar when the latter is in its operative position and a member adjacent and above said one edge of said slide bar.

7. The combination of claim 4 and a housing secured between said longitudinal members and opening towards said king pin, said stop bar being disposed in said housing, said housing including a wall spaced above said stop bar a distance slightly in excess of the thickness of said slide bar, the latter being slidable over said stop bar and into said space in the inoperative position of said slide bar.

8. The combination of claim 7 and a spring anchored in said housing and bearing on said slide bar urging the latter downwardly against said stop bar in the inoperative position and against said plate in the operative position.

9. The combination of claim 8 wherein said wall of said housing includes a portion at the open end of said housing which extends beyond said confronting edge of said stop bar.

10. The combination of claim 4 wherein the length and width of said slot relative to the cross-section of said king pin and the length of said slide bar is such that said slot is effectively closed off when said slide bar is in its operative position.

References Cited in the file of this patent

UNITED STATES PATENTS

| | | |
|---|---|---|
| 2,494,799 | Duvall et al. | Jan. 17, 1950 |
| 2,831,704 | Tenenbaum | Apr. 22, 1958 |
| 2,838,324 | Dalton | June 10, 1958 |